United States Patent
Zhou et al.

(10) Patent No.: US 12,206,071 B2
(45) Date of Patent: Jan. 21, 2025

(54) DUAL-ADDITIVE ELECTROLYTE SOLUTIONS FOR OVERCHARGE RESPONSE MITIGATION

(71) Applicant: FORD GLOBAL TECHNOLOGIES, LLC, Dearborn, MI (US)

(72) Inventors: Qian Zhou, Northville, MI (US); Mark Nelson Main, Livonia, MI (US); Kent Snyder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 17/586,232

(22) Filed: Jan. 27, 2022

(65) Prior Publication Data
US 2023/0238577 A1  Jul. 27, 2023

(51) Int. Cl.
| H01M 10/0567 | (2010.01) |
| H01M 10/0525 | (2010.01) |
| H01M 10/0568 | (2010.01) |
| H01M 10/42   | (2006.01) |

(52) U.S. Cl.
CPC ... *H01M 10/0567* (2013.01); *H01M 10/0525* (2013.01); *H01M 10/0568* (2013.01); *H01M 10/4235* (2013.01); *H01M 2300/0025* (2013.01)

(58) Field of Classification Search
None
See application file for complete search history.

(56) References Cited

U.S. PATENT DOCUMENTS

| 6,686,724 B2 | 2/2004 | Coates et al. |
| 8,758,945 B2 | 6/2014 | Casteel, Jr. |
| 9,231,276 B2 | 1/2016 | Kotato et al. |
| 9,991,566 B2 | 6/2018 | Hallac et al. |
| 2007/0172729 A1* | 7/2007 | Cho ............... H01M 10/0567 429/200 |

FOREIGN PATENT DOCUMENTS

| CN | 106340674 A | 1/2017 |
| CN | 110808403 A | 2/2020 |
| CN | 112310477 A | 2/2021 |
| JP | 2007299542 A | 11/2007 |
| KR | 100560211 B1 | 5/2004 |
| TW | I239672 B | 9/2005 |

OTHER PUBLICATIONS

Abe, Koji, et al. "Functional electrolytes: Novel type additives for cathode materials, providing high cycleability performance." Journal of Power Sources 153.2 (2006): 328-335.
Xia, J., et al. "Study of triallyl phosphate as an electrolyte additive for high voltage lithium-ion cells." Journal of Power Sources 295 (2015): 203-211.
Lee, Hochun, et al. "Co-use of cyclohexyl benzene and biphenyl for overcharge protection of lithium-ion batteries." Electrochemical and Solid State Letters 9.6 (2006): A307.
Xu, M. Q., et al. "Application of cyclohexyl benzene as electrolyte additive for overcharge protection of lithium ion battery." Journal of Power Sources 184.2 (2008): 427-431.
Wood, Kevin N., et al. "Dendrites and pits: Untangling the complex behavior of lithium metal anodes through operando video microscopy." ACS central science 2.11 (2016): 790-801.
Goodenough, John B., and Kyu-Sung Park. "The Li-ion rechargeable battery: a perspective." Journal of the American Chemical Society 135.4 (2013): 1167-1176.

* cited by examiner

*Primary Examiner* — Laura Weiner
(74) *Attorney, Agent, or Firm* — David B Kelley; Brooks Kushman. P.C

(57) ABSTRACT

An electrochemical cell including an additive mixture for alleviating the symptoms of overcharge is disclosed. The additive mixture may include a combination of at least two of diethyl allylphosphonate, 4-fluorobiphenyl, and 1-phenyl-1-cyclohexene. For example, an electrolyte may include allylphosphonate and 4-fluorobiphenyl. In yet another example, an electrolyte may include 1-phenyl-1-cyclohexene.

13 Claims, 3 Drawing Sheets

DUAL-ADDITIVE ELECTROLYTE SOLUTIONS FOR OVERCHARGE RESPONSE MITIGATION

TECHNICAL FIELD

The present disclosure relates to electrolyte additive solutions and more specifically, additive combinations for mitigating overcharge in electrochemical cells.

BACKGROUND

Advances to reduce dependence on fossil fuels and use other energy sources are underway. However, many of these efforts require or rely on the storage of the energy sourced from the other methods. Electrochemical cells such as batteries are a primary method of storing such energy. For example, lithium-ion batteries may be used. Batteries may be particularly important to electric vehicles (EVs) or hybrid electric vehicles (HEVs). Lithium-ion batteries can operate at high voltages, and high specific energies. They also employ high energy densities and low self-discharge rates. Lithium-ion batteries may have a long cycle life and operate at a wide range of temperatures. However, during overcharging lithium-ions may be removed from the cathode despite exhausting cyclable lithium and build up on the anode (e.g., lithium plating). This may cause alterations to the crystal structures of electrodes or result in degradation which may reduce performance. Further, increased cell potentials and temperatures may lead to electrolyte breakdown, melting of components such as the separator, internal shorting, exothermic side reactions, and thermal runaway. Accordingly, there remains a need for improved electrolytes.

SUMMARY

An electrochemical cell including an electrolyte, positive electrode and negative electrode is disclosed. The electrolyte includes diethyl allylphosphonate and a second additive. The second additive may be 4-fluorobiphenyl, 1-phenyl-1-cyclohexene, or a combination thereof.

An electrolyte solution including a solvent and/or solvent mixture having a lithium salt dissolved therein and overcharge additives is disclosed. The lithium salt provides free lithium ions in the solution. The overcharge additives include diethyl allylphosphonate and 4-fluorobiphenyl, 1-phenyl-cyclohexene, or a combination thereof.

An additive mixture for mitigating overcharge response is disclosed. The additive mixture includes at least two of diethyl allylphosphonate, 4-fluorobiphenyl, and 1-phenyl-1-cyclohexene.

DETAILED DESCRIPTION

Figure 1:
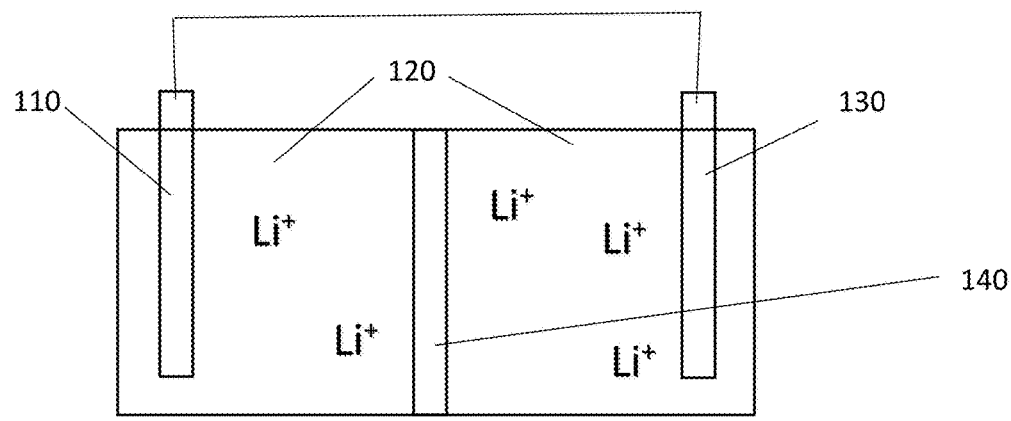
FIG. 1 is an electrochemical cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for given purpose implies the mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10.

Similarly, the range 1 to 100 includes 1, 2, 3, 4 ... 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

An electrochemical cell including an electrolyte additive mixture, as shown in FIG. 1, is disclosed. The electrochemical cell 100 may include a plurality of electrodes such as a first electrode 110 (e.g., cathode/positive electrode) and a second electrode 130 (e.g., anode/negative electrode), and an electrolyte 120 in contact with each electrode. The electrochemical cell 100 may also include a separator 140 and/or current collector. In one embodiment, the electrochemical cell 100 may be a lithium-ion battery such that lithium ions may move between the electrodes through the electrolyte 120.

In a refinement, the electrodes may include graphite, and/or an intercalated lithium compound. For example, the cathode may include a lithium- and manganese-rich composite cathode (LMR), nickel-manganese-cobalt (NMC) material, lithium cobalt oxide ($LiCoO_2$), lithium iron phosphonate ($LiFePO_4$), lithium manganese oxide ($LiMn_2O_4$ spinel/$Li_2MnO_3$), and/or lithium nickel manganese cobalt oxide ($LiNiMnCoO_2$) and the anode may include graphite, other forms of carbon, silicon or silicon oxide, lithium titanate (LTO), or lithium metal.

The electrolyte may be a solution, hybrid-solid electrolyte, or polymer electrolyte. The electrolyte may include lithium ions from a lithium salt. For example, the lithium salt may be hexafluorophosphate ($LiPF_6$), $LiPF_3(C_2F_5)_3$, $LiAsF_6$, $LiClO_4$, $LiBF_4$, $LiSO_3CF_3$, $LiN(SO_2CF_3)_2$, $LiC(SO_2CF_3)_3$, LiBETI, $LiBC_4O_8$, LiBOB, LiFAP, LiODFB, LiTFSI or a combination thereof. In a refinement, the lithium salt may be dissolved in an organic solvent. Polar solvents may be particularly suitable. For example, ethylene carbonate (EC), dimethyl carbonate (DMC), ethyl methyl carbonate (EMC), propylene carbonate (PC), diethyl carbonate (DEC), or a combination thereof may be used.

The electrolyte may include one or more additives. In a refinement, the electrolyte may include an additive package or mixture. The additives may alter or mitigate the overcharge response and/or other abuse response phenomena (i.e., overcharge additives). Additives may also improve high voltage performance. For instance, the additives may delay the initiation of thermal runaway. For example, cyclohexylbenzene (CHB), biphenyl (BP), triallyl phosphate (TAP), 4-fluorobiphenyl, 1-phenyl-1-cyclohexene, diethyl allylphosphonate, or a combination thereof may be used. In a refinement, the additive package or mixture may include at least two overcharge additives. A combination of at least two additives may have synergistic effects. For example, the additive package or mixture may include diethyl allylphosphonate and 4-fluorobiphenyl. In yet another example, the additive package or mixture may include diethyl allylphosphonate and 1-phenyl-1-cyclohexene. In still another embodiment, the mixture may include diethyl allylphosphonate and a combination of 4-fluorobiphenyl and 1-phenyl-cyclohexene.

The additive mixture or package may be present in an amount of 0.01 to 5%, or more preferably 0.5 to 3.5%, or even more preferably 2 to 3% by weight of the electrolyte. In a variation, the additive mixture may include a first additive present in an amount of 0.5 to 3.5%, or more preferably 1.0 to 3.0%, and even more preferably 1.5 to 2.5% by weight of the electrolyte and a second additive present in an amount of 0.1 to 2.0%, or more preferably 0.1 to 1.0%, or even more preferably 0.25% to 0.75% by weight of the electrolyte. In a refinement, the first additive is diethyl allylphosphonate and the second additive is 4-fluorobiphenyl or 1-phenyl-1-cyclohexene. For example, the first additive may be present in an amount of 0.4 to 0.6% by weight of the electrolyte and the second additive may be present in an amount of 1.75% to 2.25% by weight of the electrolyte.

Electrolyte compositions may be prepared as shown in Table 1.

TABLE 1

| Additive | CoH | HCA | HCB |
|---|---|---|---|
| diethyl allylphosphonate | — | 2.0 wt. % | 2.0 wt. % |
| 4-fluorobiphenyl | — | 0.5 wt. % | — |
| 1-phenyl-1-cyclohexene | — | — | 0.5 wt. % |
| electrolyte solution | 100 wt. % | 97.5 wt. % | 97.5 wt. % |

Figure 2:
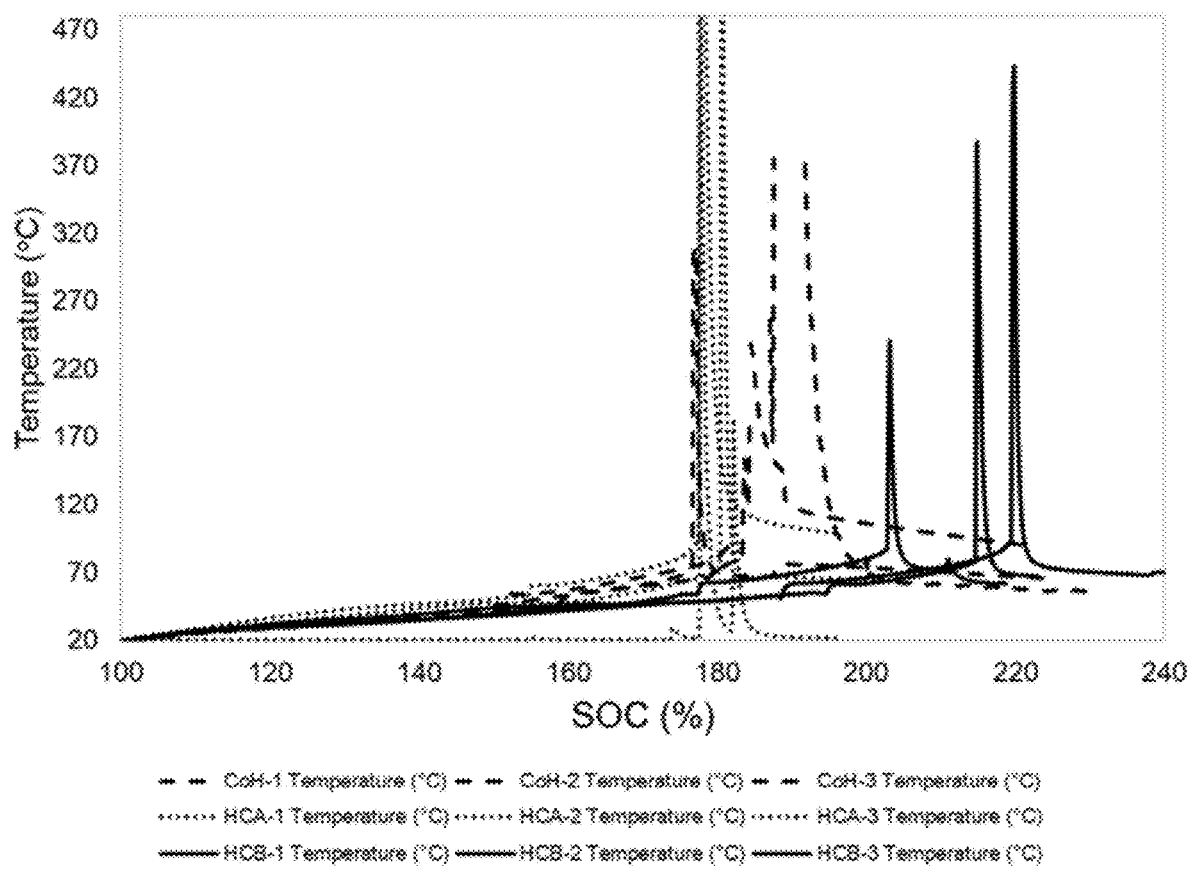
FIG. 2 is an overcharge temperature analysis of electrochemical cells.
Figure 3:
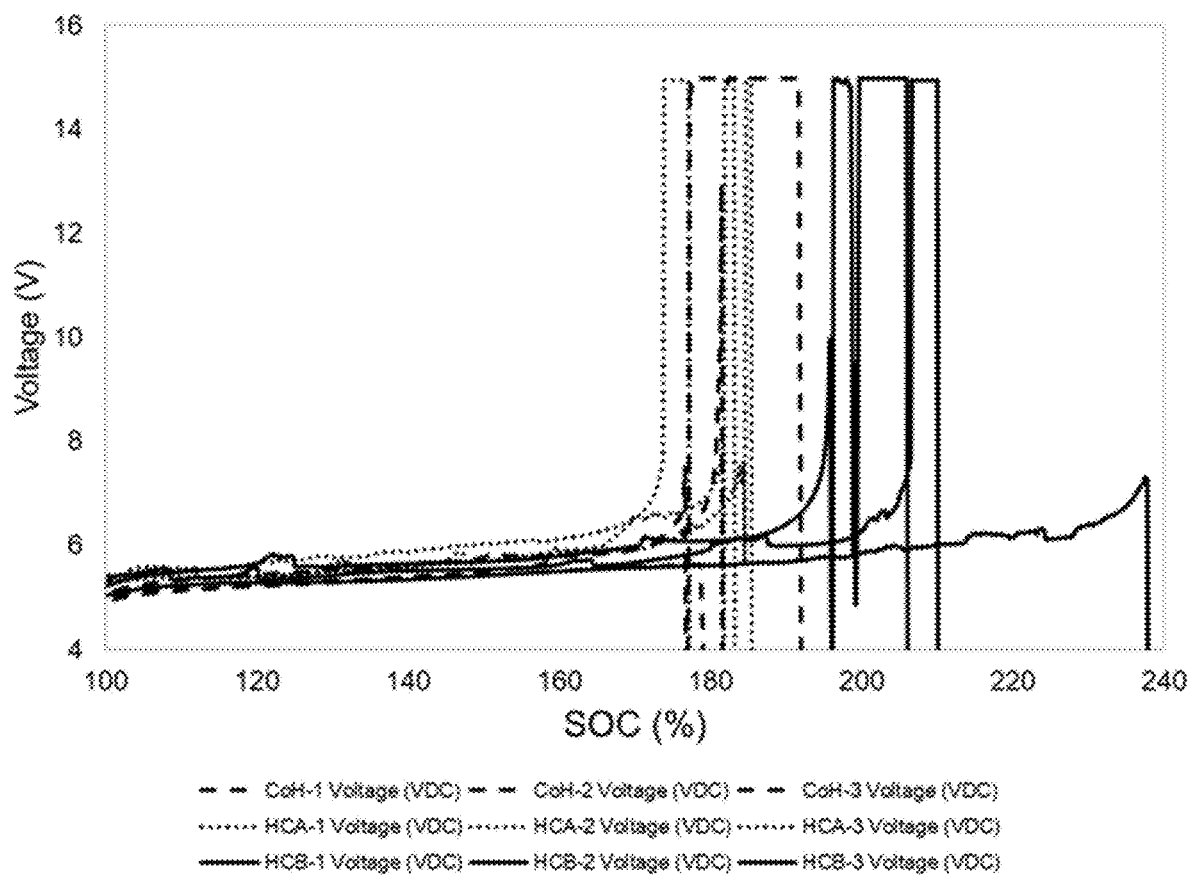
FIG. 3 is an overcharge voltage analysis of electrochemical cells.
Figure 4:
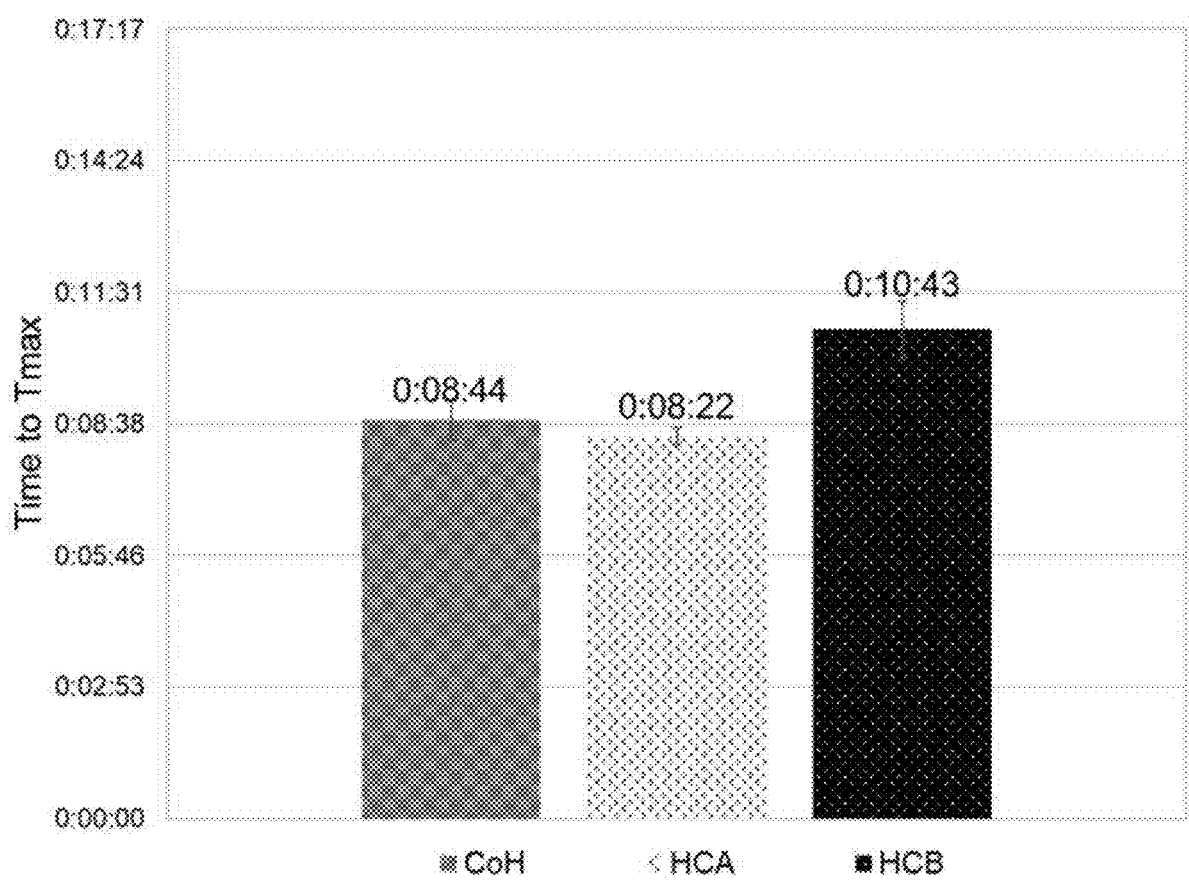
FIG. 4 is a bar chart showing time until the initiation of thermal runaway of electrochemical cells.

The electrolyte solution was formed by dissolving 1.2 moles of lithium hexafluorophosphate (1.2 M $LiPF_6$) in a solution of ethylene carbonate (EC) and dimethyl carbonate (DMC) at a volume ratio of 3:7 (i.e., 3:7 v/v). The additives were then added to the electrolyte solution. The electrolyte compositions were then injected and tested in 3 Ah NMC532/Gr dry cells. The cells were subject to overcharge from 100% to 250% SOC at a rate of 5C. Temperature and voltage profiles were captured for each and are shown in FIGS. 2-3. Further, FIG. 4 demonstrates the average time to initial thermal runaway for the three formulations represented in Table 1. The combination of diethyl allylphosphonate and 1-phenyl-1-cyclohexene in the amounts described above provided a significant delay in the onset of thermal runaway.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. An electrochemical cell comprising:
  an electrolyte having a lithium salt, a first additive, and a second additive, wherein the first additive is diethyl allylphosphonate and the second additive includes 1-phenyl-1-cyclohexene, 4-fluorobiphenyl, or a com- bination thereof, the first additive being present in an amount of 0.5 to 3.5% by weight of the electrolyte and the second additive being present in an amount of 0.01 to 2.0% by weight of the electrolyte;

a positive electrode in contact with the electrolyte; and a negative electrode in contact with the electrolyte.

2. The electrochemical cell of claim 1, wherein the second additive is present in an amount of 0.1 to 1% by weight of the electrolyte.

3. The electrochemical cell of claim 2, wherein diethyl allylphosphonate is present in an amount of 1.0 to 3.0% by weight of the electrolyte.

4. The electrochemical cell of claim 1, wherein the second additive is present in an amount of 0.25% to 0.75% by weight of the electrolyte.

5. The electrochemical cell of claim 4, wherein diethyl allylphosphonate is present in an amount of 1.5 to 2.5% by weight of the electrolyte.

6. The electrochemical cell of claim 1, wherein the second additive is present in an amount of 0.4 to 0.6% by weight and diethyl allylphosphonate is present in an amount of 1.75% to 2.25% by weight of the electrolyte.

7. The electrochemical cell of claim 1, wherein 4-fluorobiphenyl is present in an amount of 0.01 to 2.0% by weight of the electrolyte.

8. The electrochemical cell of claim 7, wherein diethyl allylphosphonate is present in an amount of 0.5 to 3.5% by weight of the electrolyte.

9. The electrochemical cell of claim 8, wherein 4-fluorobiphenyl is present in an amount of 0.1 to 1% by weight of the electrolyte.

10. The electrochemical cell of claim 9, wherein diethyl allylphosphonate is present in an amount of 1.0 to 3.0% by weight of the electrolyte.

11. The electrochemical cell of claim 10, wherein 4-fluorobiphenyl is present in an amount of 0.25% to 0.75% by weight of the electrolyte.

12. The electrochemical cell of claim 11, wherein diethyl allylphosphonate is present in an amount of 1.5 to 2.5% by weight of the electrolyte.

13. The electrochemical cell of claim 1, wherein the 4-fluorobiphenyl is present in an amount of 0.4 to 0.6% by weight and diethyl allylphosphonate is present in an amount of 1.75% to 2.25% by weight of the electrolyte.

* * * * *